(12) United States Patent
Fu et al.

(10) Patent No.: US 11,630,228 B1
(45) Date of Patent: Apr. 18, 2023

(54) PHYSICAL EMBEDDED DEEP LEARNING FORMATION PRESSURE PREDICTION METHOD, DEVICE, MEDIUM AND EQUIPMENT

(71) Applicant: China University of Petroleum (East China), Shangdong (CN)

(72) Inventors: Liyun Fu, Shangdong (CN); Yifan Cheng, Shangdong (CN); Zhiwei Wang, Shangdong (CN); Shikai Jian, Shangdong (CN); Wubing Deng, Shangdong (CN)

( * ) Notice: Subject to any disclaimer, the term of this patent is extended or adjusted under 35 U.S.C. 154(b) by 0 days.

(21) Appl. No.: 17/865,928

(22) Filed: Jul. 15, 2022

(30) Foreign Application Priority Data

Apr. 27, 2022 (CN) .......................... 202210456226.7

(51) Int. Cl.
*G01V 1/50* (2006.01)
*G06N 3/04* (2006.01)

(52) U.S. Cl.
CPC .................. *G01V 1/50* (2013.01); *G06N 3/04* (2013.01); *G01V 2210/60* (2013.01)

(58) Field of Classification Search
CPC ......... G01V 1/50; G01V 2210/60; G06N 3/04
See application file for complete search history.

(56) References Cited

U.S. PATENT DOCUMENTS

| | | | | |
|---|---|---|---|---|
| 11,520,077 B2* | 12/2022 | Denli | ..................... | G01V 1/303 |
| 2020/0309979 A1* | 10/2020 | Wang | ................... | G01V 99/005 |
| 2021/0041596 A1* | 2/2021 | Kushwaha | ............. | G01V 1/282 |
| 2021/0089897 A1* | 3/2021 | Zhang | ..................... | G01V 1/306 |
| 2021/0264262 A1* | 8/2021 | Colombo | ................ | G01V 3/00 |
| 2021/0326721 A1* | 10/2021 | Zhang | ..................... | G06N 3/084 |
| 2022/0066064 A1* | 3/2022 | Al-Garni | ................ | G01V 1/302 |
| 2022/0129788 A1* | 4/2022 | Zhang | ..................... | E21B 49/00 |
| 2022/0187492 A1* | 6/2022 | Colombo | ............... | G01V 9/007 |

* cited by examiner

*Primary Examiner* — Raymond L Nimox (57) ABSTRACT

The present invention discloses a physical embedded deep learning formation pressure prediction method, device, medium and equipment, the present invention characterizes seismic attenuation by logging impedance quality factor Q, based on the Q value and rock physics model of formation pressure, the physical mechanism of this kind of certainty replace Caianiello convolution neurons of the nonlinear activation function, using the convolution neurons, build deep learning convolution neural networks (CCNNs), can greatly increase the stress inversion precision and learning efficiency, get accurate formation pressure prediction results. Compared with the prior art, the present invention uses acoustic attenuation instead of the traditional acoustic velocity to characterize formation pressure, and solves the problem that the traditional pressure prediction method based on velocity has strong multiple solutions due to high gas content and complex structure.

11 Claims, 8 Drawing Sheets

PHYSICAL EMBEDDED DEEP LEARNING FORMATION PRESSURE PREDICTION METHOD, DEVICE, MEDIUM AND EQUIPMENT

CROSS REFERENCE TO RELATED APPLICATION

This application claims priority benefit of Chinese Invention Application No. 202210456226.7, filed on Apr. 27, 2022, and the entire contents of which are incorporated herein by reference.

BACKGROUND

Technical Field

The invention belongs to the technical field of prediction technology of reservoir characteristic parameters related to oil and gas resource exploration, relates to a deep learning formation pressure prediction method, particularly, it is a deep learning formation pressure prediction technology based on rock physical models, and more particularly, it is for physical embedded deep learning formation pressure prediction methods, devices, media and equipment.

Background Art

Formation pressure refers to the pressure that the pore fluids in the underground rock layer. When the pore fluid pressure is greater than the hydrostatic pressure, it is called the overpressured formation. Overpressures formations are widely distributed in petroleum basins and significantly impact drilling safety and oil/gas production. Pressure prediction has long been one of subject of research focuses in petroleum geology and exploration. Accurate pressure predictions are essential for the potential evaluation and safety production of oil and gas resources.

The traditional methods for overpressure prediction are based on the change of acoustic velocities when waves propagate through overpressured formations. The overpressure reduces the wave propagation velocity, causes it deviates from the normal compaction trend line. The formation pressure is calculated according to the deviation degree. Traditional method is suitable for overpressure formation caused by disequilibrium compaction of sedimentary strata, and the velocity variation of seismic wave propagation in such strata follows the overpressure loading curve.

With the development of unconventional and ultra-deep oil and gas exploration, it is found that oil-gas overpressure system is often closely related to the expansion and migration of fluid caused by gas generation from source rock. On the one hand, the influence of high gas content on seismic wave velocity is much greater than that caused by pressure change, which makes the traditional pressure prediction method based on velocity have strong multi-solution. On the other hand, the seismic velocity data obtained from seismic data are generally smooth, so it is impossible to carry out precision pressure prediction analysis.

SUMMARY

The present invention provides a physical embedded deep learning formation pressure prediction method, device, medium and equipment. The present invention characterizes seismic attenuation by impedance quality factor Q and builds rock physics model based on Q value and formation pressure. By replacing the nonlinear activation function of Caianiello convolution neuron with deterministic physical mechanism, a deep learning Caianiello convolution neural networks (CCNNs) are constructed using the convolution neuron, which can greatly improve the pressure inversion accuracy and network learning efficiency, and obtain accurate formation pressure prediction results.

For realizing the above purpose, the technical scheme provided by the present invention is as follows:

A physical embedded deep learning formation pressure prediction method, comprising the following steps:

S1. Collection of data during oil and gas exploration and development;

S2. According to the data collected in step S1, the logging impedance quality factor Q is calculated by the slippage windows method;

S3. According to the data collected in step S1 and the logging impedance quality factor Q obtained in step S2, a Q-pressure rock physical model based on well-logging data is established and cross-verified:

S4. According to the data collected in step S1, the well-seismic correlation analysis is performed on the drilling position, and the best frequency component of the seismic data is determined. Based on the optimal frequency component, the Q-pressure rock physical model based on well logging data obtained in step S3 is extended to the well-side seismic data, and the Q-pressure rock physical model based on seismic data is established;

S5. The nonlinear activation function of Caianiello convolution neuron is replaced with the Q-pressure rock physics model based on seismic data obtained in Step S4, and the deep learning convolution neural networks are constructed by using the convolution neuron to obtain the physical embedded deep learning formation pressure prediction networks CCNNs;

S6. The physical embedded deep learning formation pressure prediction networks CCNNs obtained in Step S5 is used to invert formation pressure.

Preferably, in step S1, the data includes 3D seismic data, well-logging data and drilling pressure test (DST) data.

Preferably, in step S2, the value of logging impedance quality factor Q can be obtained according to the calculation formula:

$$Q = \frac{\pi f - \frac{\alpha^2 v^2}{4\pi f}}{\alpha v}$$

Wherein f is the peak frequency, $\alpha$ is the attenuation coefficient, v is the acoustic velocity.

More preferably, in order to better integrate well seismic data, seismic impedance z is used to replace v, and the logging impedance quality factor Q is calculated.

More preferably, the calculation method of the logging impedance quality factor Q is as follows:

For well impedance data, the slippage windows method is used to calculate the logging impedance quality factor Q, time-frequency transformation is carried out for each slide, peak frequency and attenuation coefficient are calculated, and window length and sliding step length are adjusted to obtain a reasonable Q value.

Preferably, in step S4, the method for determining the optimal frequency component of the well-side seismic data described is: First, synthetic seismograms as a traditional tool are produced to evaluate the well-seismic correlation in phase with an attempt to provide the depth-to-time conversion of impedance logs. Secondly, the well impedance is filtered to match the seismic frequency band, and the correlation analysis is conducted with the relative impedance channel of the well-side seismic. The correlation coefficient is calculated as a frequency function to determine the optimal frequency component of the well-side seismic data. The Q-pressure rock physics model based on well-logging data is extended to well-side seismic data. Signal similarity is described by correlation function.

More preferably, the correlation function is obtained:

$$\rho_{xy}(\tau) = \frac{\frac{1}{2T}\int_{-T}^{T} x(t)y(t+\tau)dt}{\sqrt{\frac{1}{2T}\int_{-T}^{T} x(t)^2 dt}\sqrt{\frac{1}{2T}\int_{-T}^{T} y(t+\tau)^2 dt}}$$

Wherein x(t) and y(t) is two signals with period 2T, τ is the shift of the signal in time, dt is the derivative with respect to time, $\rho_{xy}(\tau)$ is the correlation coefficient between signal y(t) and signal x(t) after shift by r.

Preferably, in step S6, the inversion method of formation pressure includes the following steps:

(1) Pre-positioning CCNNs neural wavelet by well-side deep learning;

(2) Inversion of initial pressure model based on CCNNs deconvolution;

(3) The initial pressure model is modified based on CCNNs input signal reconstruction method.

More preferably, in step S6(2), according to the deep learning formation pressure prediction networks CCNNs, which is physically embedded and obtained in Step S5, the initial pressure model is obtained through deconvolution inversion.

More preferably, in step S6(3), the specific method of modifying the initial pressure model is as follows:

The initial pressure model is taken as the input signal, the actual 3D seismic data is taken as the expected output, and the initial pressure model is modified by the input signal reconstruction method to minimize the error between the neural network output and the expected output, namely, the formation pressure prediction result is obtained.

More preferably, the input signal reconstruction formula is obtained:

$$\Delta o_i(t) = -\eta(t)\frac{\partial E}{\partial o_i(t)} = \sum_j \eta(t)\delta_j(t) \otimes w_{ji}(t)$$

Wherein $\Delta o_i(t)$ is the input signal correction, η(t) is the learning efficiency, E is the cost function, $o_i(t)$ is the input signal, $\delta_j(t)$ is the back propagation error, $w_{ji}(t)$ is the neural wavelet, ⊗ is the correlation operator, $$\frac{\partial E}{\partial o_i(t)}$$

is the partial derivatives of cost function to the input signal.

The second object of the present invention is to provide a physical embedded deep learning formation pressure prediction device, comprising:

Module 1: Used to collect and store data in the process of oil and gas exploration and development;

Module 2: Used for logging impedance quality factor Q calculation, and establish Q-pressure rock physical model based on well-logging data and cross-verify the model;

Module 3: Used for determining the optimal frequency components of well-side seismic data and building Q-pressure rock physics models based on seismic data;

Module 4: Use to replace the nonlinear activation function of Caianiello convolution neuron with the Q-pressure rock physics model based on seismic data, and construct the deep learning convolution neural networks by using the convolution neuron to obtain the physical embedded deep learning formation pressure prediction networks CCNNs;

Module 5: Use to predict formation pressure through physical embedded deep learning formation pressure prediction networks CCNNs inversion.

The third object of the present invention is to provide a computer readable storage medium on which a computer program is stored, and the steps of the physical embedded deep learning formation pressure prediction method are realized when the computer program is executed by the processor.

The fourth object of the present invention is to provide a computer equipment includes a memory processor and a computer program stored on the memory that can be run on the processor executing the computer program implementing the steps of the physical embedded deep learning formation pressure prediction method.

The beneficial effects of the present invention are as follows:

(1) Attenuation attribute is more sensitive to formation pressure and is less disturbed. The present invention uses acoustic attenuation instead of the traditional acoustic velocity to represent formation pressure, which solves the problem that the traditional pressure prediction method based on velocity has strong multiple solutions due to high gas content and complex structure.

(2) The slippage windows method is used to calculate the logging impedance quality factor Q to characterize the attenuation attribute, and a reasonable Q curve is obtained by adjusting the time window size and sliding step size. The Q-pressure model is used as a deterministic rock physics model to replace the nonlinear activation function of Caianiello convolution neuron, and the deep learning convolution neural network with physical mechanism is constructed to form the physical embedded deep learning formation pressure prediction networks CCNNs. These deterministic models with physical significance provide a physical information learning with powerful feature extraction, in which the consistency of information distribution is enhanced across neurons to infer information loss in data or recover information contaminated by noise, resulting in more accurate pressure prediction results than existing techniques.

(3) The present invention provides technical support for pressure prediction and gas reservoir identification in the oil and gas-bearing basin.

DESCRIPTION OF THE EMBODIMENTS

The content of the present invention will be further described below with reference to the accompanying drawings. The experimental methods described in the following examples are conventional methods unless otherwise specified; the reagents and materials can be obtained from commercial sources unless otherwise specified.

A physical embedded deep learning formation pressure prediction method, comprising the following steps:

S1. Collection of data.

3D seismic data, well-logging data and drilling pressure test (DST) data are collected during exploration and development of oil and gas-bearing basin.

S2. The logging impedance quality factor Q is calculated.

According to the data collected in step S1, the logging impedance quality factor Q is calculated by the slippage windows method.

The value of logging impedance quality factor Q can be obtained according to the calculation formula:

$$Q = \frac{\pi f - \frac{\alpha^2 v^2}{4\pi f}}{\alpha v}$$

Wherein f is the peak frequency, $\alpha$ is the attenuation coefficient, v is the acoustic velocity.

In order to better integrate well seismic data, seismic impedance z is used to replace v and the logging impedance quality factor Q is calculated. For well impedance data, the slippage windows method is used to calculate the well impedance quality factor Q, time-frequency transformation is carried out for each slide, peak frequency and attenuation coefficient are calculated, and window length and sliding step length are adjusted to obtain a reasonable Q value.

S3. A Q-pressure rock physical model based on well-logging data is established.

According to the data obtained in step S1 and the logging impedance quality factor Q obtained in step S2, a Q-pressure rock physical model based on well-logging data is established, and the model is cross-verified. The inversion results are consistent with the measured pressure curve, and the error is within 10%.

S4. Determine seismic data, the Q-pressure rock physical model based on seismic data is established.

According to the data in step S1, the well seismic correlation in drilling position is analyzed by synthetic seismic records, and the optimal frequency component of seismic data near the well is determined. According to the optimal frequency component of the well-side seismic data obtained, the Q-pressure rock physical model based on well-logging data obtained in step S3 is extended to the well-side seismic data, and the Q-pressure rock physical model based on seismic data is established.

Specifically, synthetic seismograms as a traditional tool are produced to evaluate the well-seismic correlation in phase, and the time-depth conversion information is obtained. The well impedance is filtered to match the seismic frequency band, and the correlation analysis is conducted with the relative impedance channel of the well-side seismic. The correlation coefficient is calculated as a frequency function to determine the optimal frequency component of the well-side seismic data. The Q-pressure rock physics model based on well-logging data is extended to well-side seismic data. Signal similarity is described by correlation function.

Signal similarity is described by correlation function:

$$\rho_{xy}(\tau) = \frac{\frac{1}{2T}\int_{-T}^{T} x(t)y(t+\tau)dt}{\sqrt{\frac{1}{2T}\int_{-T}^{T} x(t)^2 dt}\sqrt{\frac{1}{2T}\int_{-T}^{T} y(t+\tau)^2 dt}}$$

Wherein X(t) and y(t) is two signals with period 2T, $\tau$ is the shift of the signal in time, di is the derivative with respect to time, $\rho_{xy}(\tau)$ is the correlation coefficient between signal y(t) and signal x(t) after shift by T.

S5. A physical embedded deep learning formation pressure prediction networks CCNNs is constructed.

The nonlinear activation function of Caianiello convolution neuron is replaced by the Q-pressure rock physics model based on seismic data obtained in Step S4, and the deep learning convolution neural networks are constructed using the convolution neuron to obtain the physical embedded deep learning formation pressure prediction networks CCNNs.

The Caianiello neuron activation function regulates the input and transmission of neural signals through specific physicochemical models, allowing us to embed certain geophysical mechanisms into Caianiello neurons as activation functions for their specific geophysical applications. Deterministic models with physical significance provide a physical information learning with powerful feature extraction, where consistency of information distribution is enhanced across neurons to infer information lost in data or recover information contaminated by noise. For pressure inversion, the Q-pressure rock physical model obtained in Step S3 is used.

S6. Inversion of formation pressure.

The physical embedded deep learning formation pressure prediction networks CCNNs obtained in Step S5 is used to invert formation pressure.

The inversion method of formation pressure includes the following steps:

(1) Pre-positioning CCNNs neural wavelet by well-side deep learning;

(2) Inversion of initial pressure model based on CCNNs deconvolution;

(3) The initial pressure model is modified based on CCNNs input signal reconstruction method.

Figure 1:
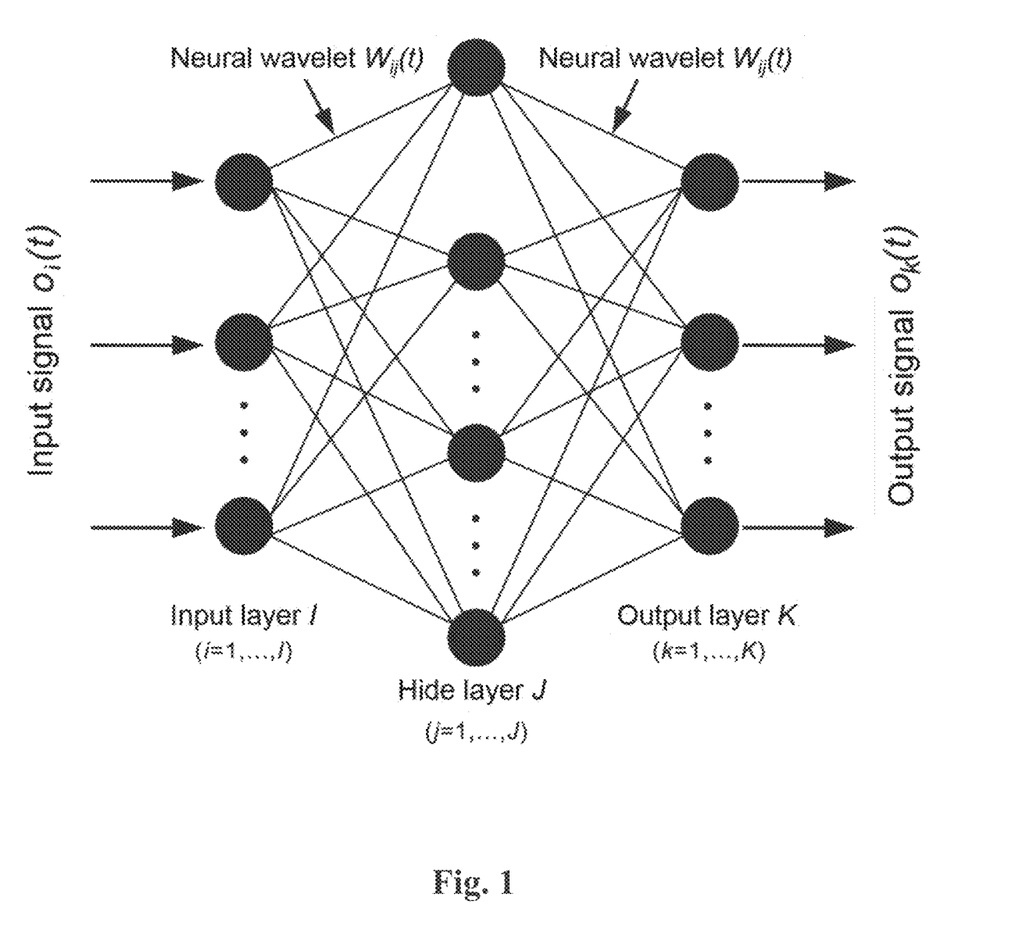
FIG. 1 is a schematic diagram of three-layer CCNN structure.

A typical CCNN has a three-layer structure of input signal, hidden layer, and expected output (FIG. 1). By selecting different input expected output and nonlinear activation functions, this neural network can be applied to most inverse problems. Neural wavelets $w_{ji}(t)$ need to be constructed between different layers for signal transmission. Neural wavelets are adaptive and provide CCNN with the ability to learn time-varying signals. The cost function of this problem is defined as follows:

$$E = \frac{1}{2}\sum_{k}\sum_{t}[d_k(t) - o_k(t)]^2$$

Wherein $d_k(t)$ is the desired output signal, $o_k(t)$ is the network actual output signal.

By applying the back-propagation learning algorithm to minimize the cost function through each layer, the updated neural wavelet equation can be obtained. The updated equation has a general recursive form for any neuron. For example, from the hidden layer to the input layer, the neural wavelet correction can be expressed as:

$$\Delta w_{ji}(t) = \eta(t)\delta_j(t) \otimes o_i(t)$$

Wherein $\otimes$ is the correlation operator, $\eta(t)$ is the learning efficiency.

Neural wavelet is adapted to the input information environment through the learning process. During the learning process, a large number of neurons with similar time spectra in the wavelet are statistically coded to improve the focusing resolution characteristics of the neurons. The Caianiello neuron equation uses the following formula:

$$\Delta o_i(t) = f\left(\sum_{j=1}^{N} \int_0^t w_{ij}(\tau) o_j(t-\tau) d\tau - \theta_i(t)\right)$$

Wherein $o_j(t)$ is the neuronal input, $o_i(t)$ is the neuronal output, $\theta_i(t)$ is the neuron threshold, $f(\bullet)$ is the activation function, $w_{ji}(t)$ is the neural wavelet.

Get physical embedded deep learning formation pressure prediction networks CCNNs after the initial pressure is obtained by deconvolution inversion model, described the initial pressure model as the input signal, the actual 3D seismic data as the desired output, fixed initial pressure model with input signal reconstruction method, the neural network output and desired output error minimization, namely the formation pressure prediction test results.

More preferably, the input signal reconstruction formula is obtained:

$$\Delta o_i(t) = -\eta(t)\frac{\partial E}{\partial o_i(t)} = \sum_j \eta(t)\delta_j(t) \otimes w_{ji}(t)$$

Wherein $\Delta o_i(t)$ is the input signal correction, $\eta(t)$ is the learning efficiency, E is the cost function, $o_i(t)$ is the input signal, $\delta_j(t)$ is the back propagation error, $w_{ji}(t)$ is the neural wavelet, $\otimes$ is the correlation operator, $$\frac{\partial E}{\partial o_i(t)}$$

is the partial derivatives of cost function to the input signal.

The second object of the present invention is to provide a physical embedded deep learning formation pressure prediction device, comprising:

Module 1: Used to collect and store data in the process of oil and gas exploration and development.

Module 2: Used for logging impedance quality factor Q calculation, and establish Q-pressure rock physical model based on well-logging data and cross-verify the model.

Module 3: Used for determining the optimal frequency components of well-side seismic data and building Q-pressure rock physics models based on seismic data.

Module 4: Use to replace the nonlinear activation function of Caianiello convolution neuron with the Q-pressure rock physics model based on seismic data, and construct the deep learning convolution neural networks by using the convolution neuron to obtain the physical embedded deep learning formation pressure prediction networks CCNNs.

Module 5: Use to predict formation pressure through physical embedded deep learning formation pressure prediction networks CCNNs inversion.

The third object of the present invention is to provide a computer readable storage medium on which a computer program is stored, and the steps of the physical embedded deep learning formation pressure prediction method are realized when the computer program is executed by the processor.

The fourth object of the present invention is to provide a computer device includes a memory processor and a computer program stored on the memory that can be run on the processor executing the computer program implementing the steps of the physical embedded deep learning formation pressure prediction method.

Example 1

Figure 2:
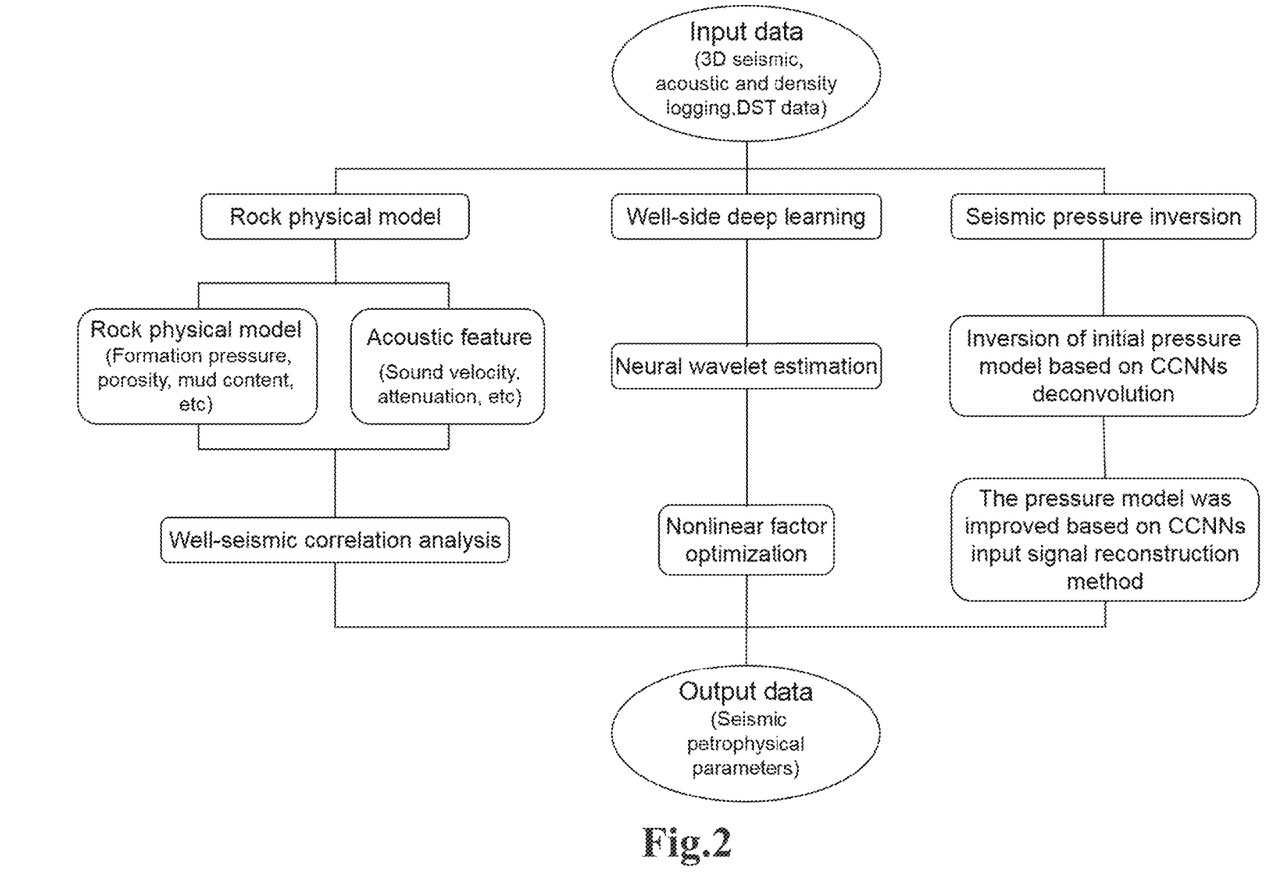
FIG. 2 is a method flow chart of the present invention.

As shown in FIG. 2, the present invention provides a physical embedded deep learning formation pressure prediction method, which consists of the following steps:

(1) Collection of seismic data, well-logging data, and drilling pressure test (DST) data collected during exploration and development of oil and gas-bearing basin.

Figure 3:
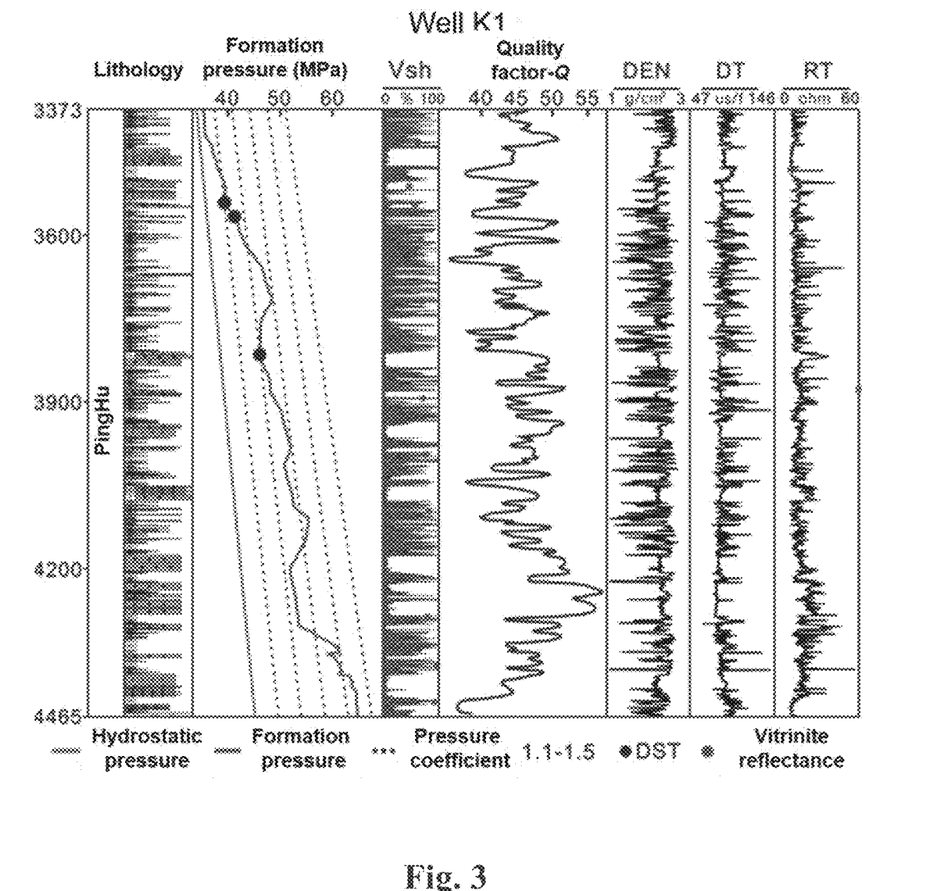
FIG. 3 is the formation pressure sensitivity analysis diagram.

(2) Using the slippage windows method to calculate logging impedance quality factor Q, can adjust the length of the window and sliding step, to obtain a reasonable Q value, and the formation pressure curve and Q curve and other logging curves are sensitivity analysis (FIG. 3). For example, in the actual work area K1 Wells, it can be seen that well logging curve and impedance quality factor Q is negative correlation between formation pressure curve, conventional logging curves such as density, acoustic time lag, and impedance, have poor response to pressure changes.

Figure 4:
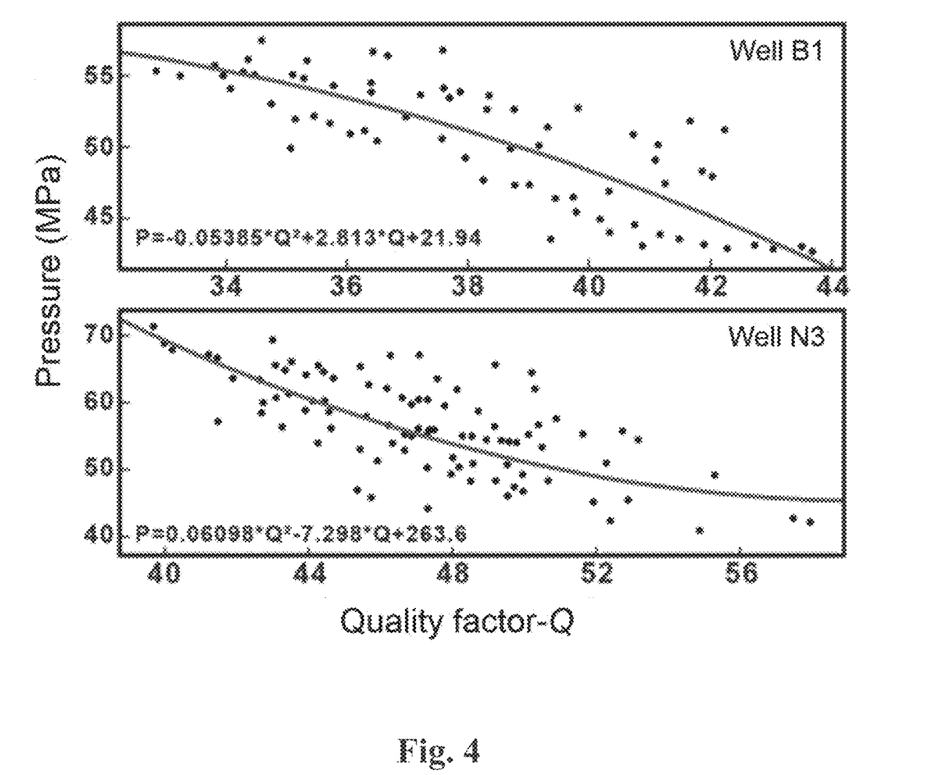
FIG. 4 is the non-linear fitting diagram of quality factor and formation pressure.
Figure 5:
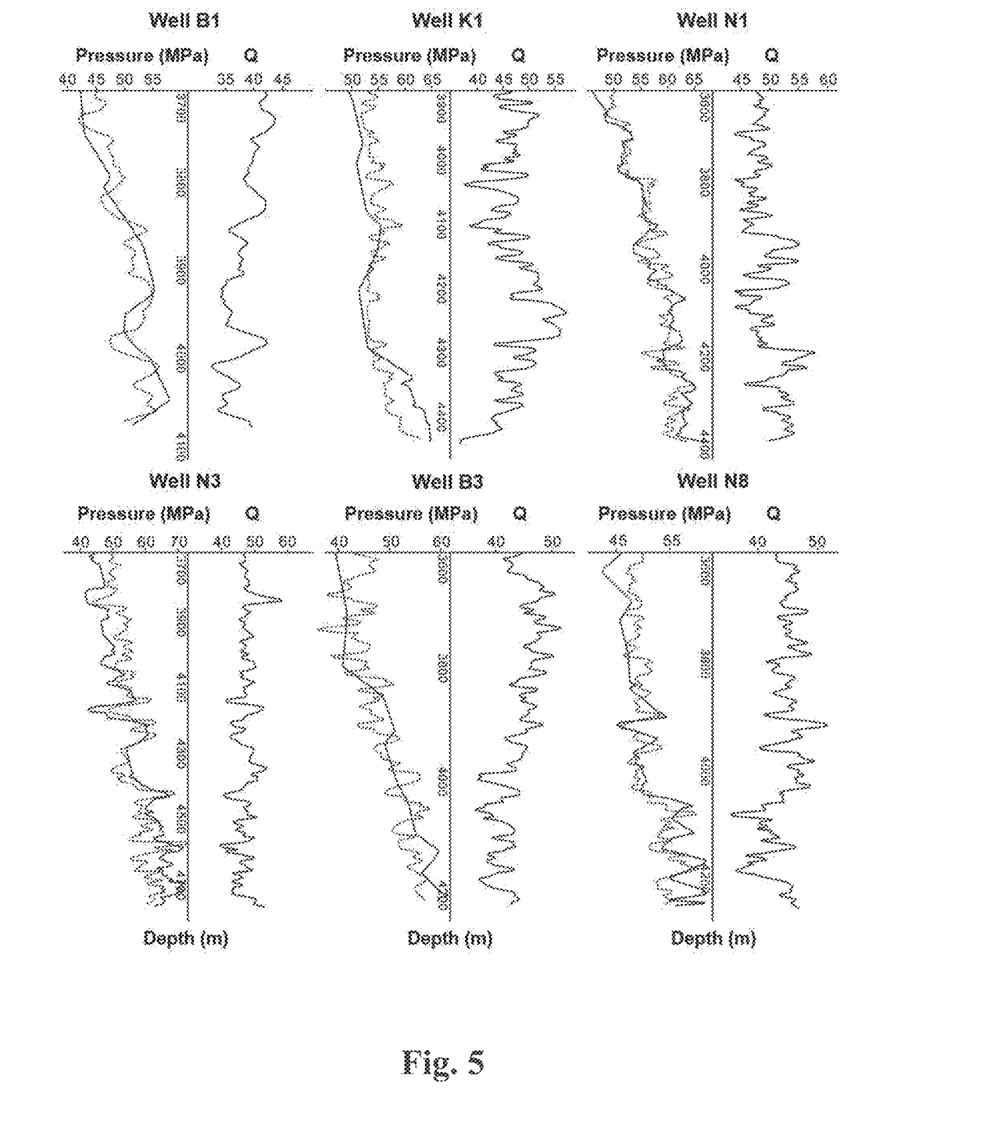
FIG. 5 is the Q-pressure rock physical model of six Wells in the actual work area.

(3) Nonlinear fitting of logging impedance quality factor Q and formation pressure is carried out to obtain their rock physical correspondence (FIG. 4), and Q-pressure rock physical model is established in several Wells in the actual work area (FIG. 5). In the figure, the solid line is the well formation pressure curve and the well impedance quality factor curve, while the dotted line is the inversion pressure curve of logging impedance quality factor. It can be seen that the inversion result is consistent with the measured pressure curve, and the error is within 10%.

Figure 6:
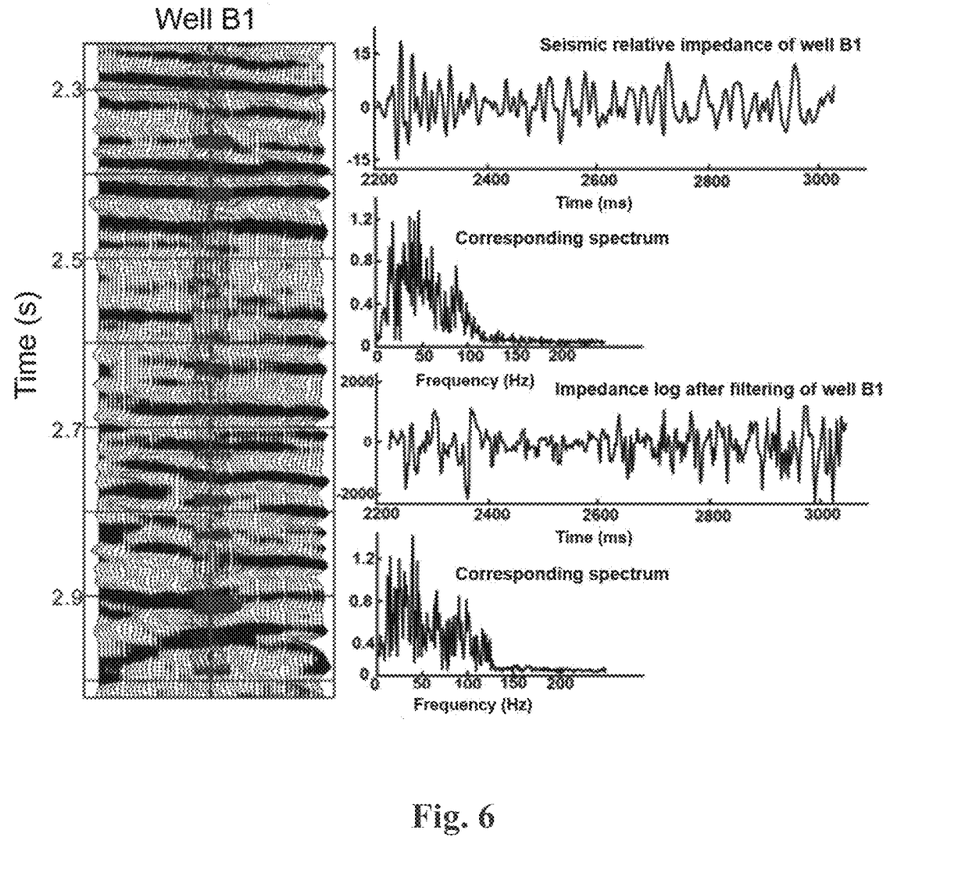
FIG. 6 is a schematic diagram of well-seismic correlation analysis.

(4) Through the synthetic seismogram analysis well seismic phase correlation, and get a deep transformation information, impedance curve of well filtering to match the seismic frequency band, and with earthquake relative impedance frequency domain correlation analysis, the seismic amplitude information (FIG. 6), reliability high correlation and well seismic data quality can ensure the rock physics model transition from well-logging data to the seismic data.

(5) To embed the Q-pressure of rock physical model CCNNs networks for learning and nonlinear inversion of seismic data of the physical information, in the process of inversion, the use of each well in the study area of rock physics Q-pressure model as well in the activation of neurons in the function, the function defines the properties of neurons, actually, the neurons in the far away from the hole using interpolation adjacent holes or extrapolated from its activation function. The activation function CCNNs inversion of formation pressure mainly includes: pre-positioning CCNNs neural wavelet by well-side deep learning, inversion of initial pressure model based on CCNNs deconvolution, improvement and modification of initial pressure model based on CCNNs input signal reconstruction method.

Figure 7:
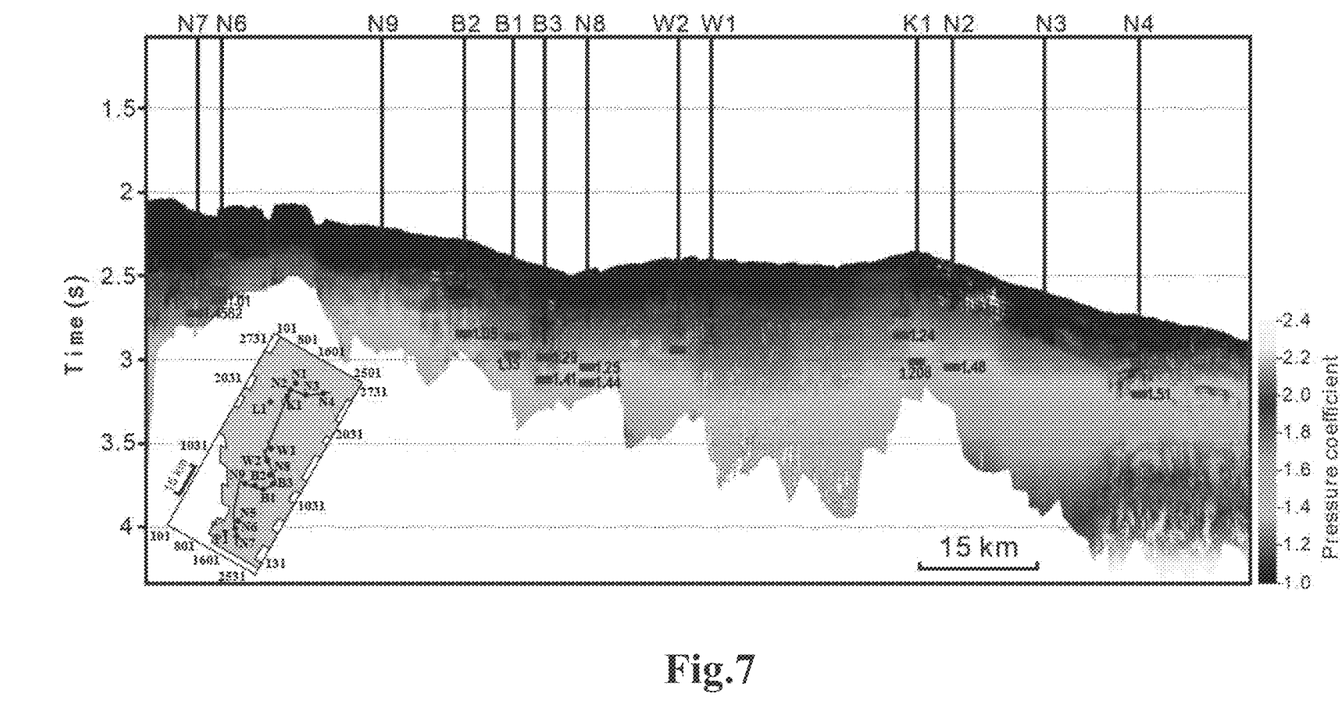
FIG. 7 is the inversion results of formation pressure by CCNNs—taking the Xihu depression as an example.
Figure 8:
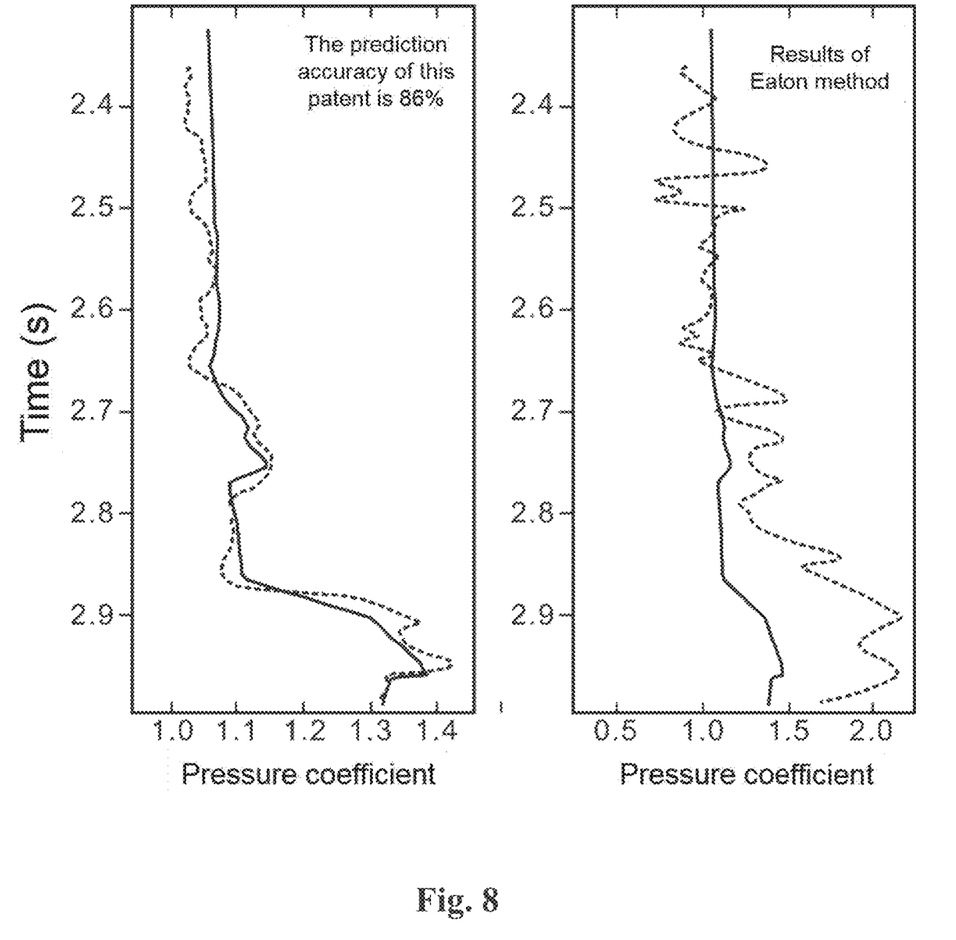
FIG. 8 is the comparison of formation pressure prediction results of validation Wells with traditional methods.

Input signal deconvolution to get initial model of formation pressure, the expected output for practical 3D seismic data, Caianiello convolution of the CCNNs input layer neurons are arranged in exactly the same configuration with seismic data of plane, namely the spatial coordinates of these neurons according to the seismic trace positioning. The initial model was improved through input signal reconstruction to minimize the error between neural network output and expected output, and finally accurate formation pressure prediction results were obtained (FIG. 7). Among them, well W2 is a verification well, and the accuracy of correlation calculation between prediction results and actual well pressure curve reaches 86%. However, the calculation results of traditional Eaton method have great errors, especially in high-pressure sections, seriously deviating from the actual formation pressure (FIG. 8). It can accurately predict the formation pressure in the oil-gas overpressure system.

The above detailed description is a specific description of one of the feasible embodiments of the present invention, which is not intended to limit the scope of the present invention. Any equivalent implementation or modification that does not depart from the present invention shall be included in the present invention.

What is claimed is:

1. A physical embedded deep learning formation pressure prediction method, characterized in that, comprising the following steps:
   S1. Collection of data during oil and gas exploration and development;
   S2. According to the data collected in step S1, the logging impedance quality factor Q is calculated by the slippage windows method;
   S3. According to the data collected in step St and the logging impedance quality factor Q obtained in step S2, a Q-pressure rock physical model based on well-logging data is established and cross-verified;
   S4. According to the data collected in step S1, the well seismic correlation analysis is performed on the drilling position, and the best frequency component of the seismic data is determined. Based on the optimal frequency component, the Q-pressure rock physical model based on well-logging data obtained in step S3 is extended to the well-side seismic data, and the Q-pressure rock physical model based on seismic data is established;
   S5. The nonlinear activation function of Caianiello convolution neuron is replaced with the Q-pressure rock physics model based on seismic data obtained in Step S4, mid the deep learning convolution neural networks are constructed by using the convolution neuron to obtain the physical embedded deep learning formation pressure prediction networks CCNNs;
   S6. The physical embedded deep learning formation pressure prediction networks CCNNs obtained in Step S5 is used to invert formation pressure.

2. The physical embedded deep learning formation pressure prediction method according to claim 1, characterized in that, wherein the data in step S1 includes 3D seismic data, well-logging data and drilling pressure test (DST) data.

3. The physical embedded deep learning formation pressure prediction method according to claim 1, characterized in that, in step S2, the value of logging impedance quality factor Q can be obtained according to the calculation formula:

$$Q = \frac{\pi f - \frac{\alpha^2 v^2}{4\pi f}}{\alpha v}$$

Wherein f is the peak frequency, α is the attenuation coefficient, v is the acoustic velocity.

4. The physical embedded deep learning formation pressure prediction method according to claim 3, characterized in that, seismic impedance z is used to replace v, and the logging impedance quality factor Q is calculated.

5. The physical embedded deep learning formation pressure prediction method according to claim 3, characterized in that, the calculation method of the logging impedance quality factor Q is as follows: For well impedance data, the slippage windows method is used to calculate the logging impedance quality factor Q, time-frequency transformation is carried out for each slide, peak frequency and attenuation coefficient are calculated, and window length and sliding step length are adjusted to obtain a reasonable Q value.

6. The physical embedded deep learning formation pressure prediction method according to claim 1, characterized in that, in step S4, the method for determining the optimal frequency component of the well-side seismic data described is: the seismic trace is synthesized from well log data, the phase correlation between well and seismic is evaluated, and the time-depth conversion information is obtained. The well impedance is filtered to match the seismic frequency band, and the correlation analysis is conducted with the relative impedance channel of the well-side seismic. The correlation coefficient is calculated as a frequency function to determine the optimal frequency component of the well-side seismic data. The Q-pressure rock physics model based on well-logging data is extended to well-side seismic data. Signal similarity is described by correlation function.

7. The physical embedded deep learning formation pressure prediction method according to claim 1, characterized in that, the correlation function is obtained:

$$\rho_{xy}(\tau) = \frac{\frac{1}{2T}\int_{-T}^{T} x(t)y(t+\tau)dt}{\sqrt{\frac{1}{2T}\int_{-T}^{T} x(t)^2 dt}\sqrt{\frac{1}{2T}\int_{-T}^{T} y(t+\tau)^2 dt}}$$

Wherein x(t) and y(t) is two signals with period 2T, τ is the shift of the signal in time, dt is the derivative with respect to time, $\rho_{xy}(\tau)$ is the correlation coefficient between signal y(t) and signal x(t) after shift by τ.

8. The physical embedded deep learning formation pressure prediction method according to claim 1, characterized in that, in step S6, the inversion method of formation pressure includes the following steps:
   (1) Pre-positioning CCNNs neural wavelet by well-side deep learning;
   (2) Inversion of initial pressure model based on CCNNs deconvolution;
   (3) The initial pressure model is modified based on CCNNs input signal reconstruction method.

9. The physical embedded deep learning formation pressure prediction method according to claim 8, characterized in that, in step S6(2), according to the deep learning formation pressure prediction networks CCNNs, which is physically embedded and obtained in Step S5, the initial pressure model is obtained through deconvolution inversion.

10. The physical embedded deep learning formation pressure prediction method according to claim 9, characterized in that, in step S6(3), the specific method of modifying the initial pressure model is as follows: The initial pressure model is taken as the input signal, the actual 3D seismic data is taken as the expected output, and the initial pressure model is modified by the input signal reconstruction method to minimize the error between the neural network output and the expected output, namely, the formation pressure prediction result is obtained.

11. The physical embedded deep learning formation pressure prediction method according to claim 10, characterized in that, the input signal reconstruction formula is obtained:

$$\Delta o_i(t) = -\eta(t)\frac{\partial E}{\partial o_i(t)} = \sum_j \eta(t)\delta_j(t) \otimes w_{ji}(t)$$

Wherein $\Delta o_i(t)$ is the input signal correction, $\eta(t)$ is the learning efficiency, E is the cost function, $o_i(t)$ is the input signal, $\delta_j(t)$ is the back propagation error, $w_{ji}(t)$ is the neural wavelet, $\otimes$ is the correlation operator, $$\frac{\partial E}{\partial o_i(t)}$$

is the partial derivatives of cost function to the input signal.

* * * * *